(12) United States Patent
Tian et al.

(10) Patent No.: US 10,922,355 B2
(45) Date of Patent: Feb. 16, 2021

(54) METHOD AND APPARATUS FOR RECOMMENDING NEWS

(71) Applicant: Baidu Online Network Technology (Beijing) Co., Ltd, Beijing (CN)

(72) Inventors: Xiaoli Tian, Beijing (CN); Zhenchao Jia, Beijing (CN); Ronghuan Ren, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 467 days.

(21) Appl. No.: 15/856,284

(22) Filed: Dec. 28, 2017

(65) Prior Publication Data

US 2019/0147050 A1    May 16, 2019

(30) Foreign Application Priority Data

Nov. 16, 2017   (CN) .......................... 2017 1 1139651

(51) Int. Cl.
*G06F 16/00* (2019.01)
*G06F 16/635* (2019.01)
*G06F 16/432* (2019.01)
*G06F 16/435* (2019.01)
*G06F 16/438* (2019.01)
*G06F 16/487* (2019.01)
*G06F 16/41* (2019.01)
*G06F 16/60* (2019.01)

(52) U.S. Cl.
CPC .......... *G06F 16/635* (2019.01); *G06F 16/433* (2019.01); *G06F 16/435* (2019.01); *G06F 16/438* (2019.01); *G06F 16/487* (2019.01); *G06F 16/41* (2019.01); *G06F 16/60* (2019.01)

(58) Field of Classification Search
CPC .... G06F 16/635; G06F 16/636; G06F 16/433; G06F 16/435; G06F 16/487
See application file for complete search history.

(56) References Cited

U.S. PATENT DOCUMENTS

| | | | | |
|---|---|---|---|---|
| 10,318,236 | B1* | 6/2019 | Pal | G10L 15/22 |
| 2007/0100650 | A1* | 5/2007 | Ramer | G06F 16/68 |
| | | | | 705/26.1 |
| 2018/0330069 | A1* | 11/2018 | Quinn | G10L 15/16 |

OTHER PUBLICATIONS

Achal Kaundinya, Voic Enabled Home Automation Using Amazon Echo, Aug. 2017, IRJET, vol. 4, p. 682-684. (Year: 2017).*

* cited by examiner

*Primary Examiner* — Thu Nguyet T Le
(74) *Attorney, Agent, or Firm* — Nixon Peabody LLP (57) ABSTRACT

Embodiments of the present disclosure disclose a method and apparatus for recommending news. A specific embodiment of the method comprises: receiving a voice request for playing news; analyzing the voice request, and determining a target attribute associated with the voice request from a preset user attribute set based on an analysis result; acquiring user attribute information corresponding to the target attribute; and selecting out target news from a to-be-recommended news database for recommendation based on the analysis result of the voice request and the user attribute information corresponding to the target attribute. Such embodiment realizes news recommendation based on voice interaction and is capable of improving the pertinence of news recommendation.

19 Claims, 5 Drawing Sheets

METHOD AND APPARATUS FOR RECOMMENDING NEWS

CROSS-REFERENCE TO RELATED APPLICATION

This application is related to and claims priority from Chinese Application No. 201711139651.9, filed on Nov. 16, 2017 and entitled "Method and Apparatus for Recommending News", the entire disclosure of which is hereby incorporated by reference.

TECHNICAL FIELD

Embodiments of the present disclosure relate to the field of computer technology, in particular to the field of Internet technology, especially to a method and apparatus for recommending news.

BACKGROUND

With the development of the computer technology and constant accumulation of the network data, the artificial intelligence technology develops rapidly. A news recommending method is used for providing news services to a user as a method for proactively recommending news to the user by using an electronic device, and is an information processing method that may simplify the operation of acquiring news by the user and improve the efficiency of the user in acquiring news.

Different users have different demands and preferences for news. When news to be recommended to a user is selected with the traditional method for recommending news, the timeliness of the news and the quality of the news content will usually be taken into consideration, and the same recommendation result is exported for different users.

SUMMARY

Embodiments of the present disclosure provide a method and apparatus for recommending news.

In a first aspect, an embodiment of the present disclosure provides a method for recommending news, comprising: receiving a voice request for playing news; analyzing the voice request, and determining a target attribute associated with the voice request from a preset user attribute set based on an analysis result; acquiring user attribute information corresponding to the target attribute; and selecting out target news from a to-be-recommended news database for recommendation based on the analysis result of the voice request and the user attribute information corresponding to the target attribute.

In some embodiments, the determining a target attribute associated with the voice request from a preset user attribute set based on an analysis result comprises: determining a news category demand as indicated by the voice request based on the analysis result; and determining a target attribute associated with the news category demand as indicated by the voice request according to a preset associated relation table between news categories and user attributes.

In some embodiments, the news categories comprise a region category, a field category and a hot keyword category.

In some embodiments, the determining a target attribute associated with the voice request from a preset user attribute set based on an analysis result comprises: judging whether the analysis result contains a keyword associated with an identifier of a user attribute in the preset user attribute set; and if yes, extracting the user attribute having the identifier matching the keyword in the analysis result as the target attribute.

In some embodiments, the selecting out target news from a to-be-recommended news database for recommendation based on the analysis result of the voice request and the user attribute information corresponding to the target attribute comprises: acquiring summary information of to-be-recommended news in the to-be-recommended news database, the summary information comprising a title and a content summary; selecting out the target news based on a similarity between the summary information of the to-be-recommended news and the analysis result as well as the user attribute information corresponding to the target attribute; and pushing the target news.

In some embodiments, the selecting out the target news based on a similarity between the summary information of the to-be-recommended news and the analysis result as well as the user attribute information corresponding to the target attribute comprises: determining a recommendation index of the to-be-recommended news based on a similarity between the summary information of the to-be-recommended news and the analysis result, and a similarity between the summary information of the to-be-recommended news and the user attribute information corresponding to the target attribute; and selecting out a target news based on the recommendation index.

In some embodiments, the selecting out the target news based on a similarity between the summary information of the to-be-recommended news and the analysis result as well as the user attribute information corresponding to the target attribute comprises: selecting out a first candidate news associated with the analysis result based on a similarity between the summary information of the to-be-recommended news and the analysis result; selecting out a second candidate news associated with the user attribute information corresponding to the target attribute based on a similarity between the summary information of the to-be-recommended news and the user attribute information corresponding to the target attribute; and using the first candidate news and the second candidate news as the target news.

In some embodiments, the pushing the target news comprises: pushing summary information of the target news; and pushing a full text of the target news in response to receiving a voice request for playing a full text of the target news.

In some embodiments, the selecting out target news from a to-be-recommended news database for recommendation based on the analysis result of the voice request and the user attribute information corresponding to the target attribute further comprises: determining recommendation order information of the target news based on a similarity between the summary information of the to-be-recommended news and the analysis result as well as the user attribute information corresponding to the target attribute; and wherein the pushing the target news comprises: pushing the target news and corresponding recommendation order information to a smart voice device to allow the smart voice device to play a target news corresponding to a preset recommendation order as indicated by the user when a request for playing the target news corresponding to the preset recommendation order is received from the user.

In some embodiments, the user attribute set comprises the following user attribute: a geographic position, an occupation or a point of interest.

In a second aspect, an embodiment of the present disclosure provides an apparatus for recommending news, comprising: a receiving unit, configured for receiving a voice request for playing news; a determination unit, configured for analyzing the voice request, and determining a target attribute associated with the voice request from a preset user attribute set based on an analysis result; an acquisition unit, configured for acquiring user attribute information corresponding to the target attribute; and a selecting unit, configured for selecting out target news from to-be-recommended news database for recommendation based on the analysis result of the voice request and the user attribute information corresponding to the target attribute.

In some embodiments, the determination unit is further configured for determining a target attribute associated with the voice request from a preset user attribute by: determining a news category demand as indicated by the voice request based on the analysis result; and determining a target attribute associated with the news category demand as indicated by the voice request according to a preset associated relation table between news categories and user attributes.

In some embodiments, the news categories comprise a region category, a field category and a hot keyword category.

In some embodiments, the determination unit is further configured for determining a target attribute associated with the voice request from a preset user attribute by: judging whether the analysis result contains a keyword associated with an identifier of a user attribute in the preset user attribute set; and if yes, extracting the user attribute having the identifier matching the keyword in the analysis result as the target attribute.

In some embodiments, the selecting out target news from to-be-recommended news database for recommendation by: acquiring summary information of to-be-recommended news in the to-be-recommended news database, the summary information comprising a title and a content summary; selecting out the target news based on a similarity between the summary information of the to-be-recommended news and the analysis result as well as the user attribute information corresponding to the target attribute; and pushing the target news.

In some embodiments, the selecting unit is further configured for selecting out the target news based on a similarity between the summary information of the to-be-recommended news and the analysis result as well as the user attribute information corresponding to the target attribute by: determining a recommendation index of the to-be-recommended news based on a similarity between the summary information of the to-be-recommended news and the analysis result, and a similarity between the summary information of the to-be-recommended news and the user attribute information corresponding to the target attribute; and selecting out a target news based on the recommendation index.

In some embodiments, the selecting unit is further configured for selecting out the target news based on a similarity between the summary information of the to-be-recommended news and the analysis result as well as the user attribute information corresponding to the target attribute by: selecting out a first candidate news associated with the analysis result based on a similarity between the summary information of the to-be-recommended news and the analysis result; selecting out a second candidate news associated with the user attribute information corresponding to the target attribute based on a similarity between the summary information of the to-be-recommended news and the user attribute information corresponding to the target attribute; and using the first candidate news and the second candidate news as the target news.

In some embodiments, the selecting unit is configured for pushing the target news by: pushing summary information of the target news; and pushing a full text of the target news in response to receiving a voice request for playing a full text of the target news.

In some embodiments, the selecting unit is further configured for: determining recommendation order information of the target news based on a similarity between the summary information of the to-be-recommended news and the analysis result as well as the user attribute information corresponding to the target attribute; and the selecting unit is further configured for pushing the target news by: pushing the target news and corresponding recommendation order information to a smart voice device to allow the smart voice device to play a target news corresponding to a preset recommendation order as indicated by the user when a request for playing the target news corresponding to the preset recommendation order is received from the user.

In some embodiments, the user attribute set comprises the following user attribute: a geographic position, an occupation or a point of interest.

The method and apparatus for recommending news provided by an embodiment of the present disclosure realize news recommendation based on voice interaction by: receiving a voice request for playing news; analyzing the voice request, and determining a target attribute associated with the voice request from a preset user attribute set based on an analysis result; acquiring user attribute information corresponding to the target attribute; and selecting out target news from to-be-recommended news database for recommendation based on the analysis result of the voice request and the user attribute information corresponding to the target attribute. In addition, such method and apparatus improve the pertinence of news recommendation by determining associated user attribute information based on the analysis result of the voice request while in recommendation.

BRIEF DESCRIPTION OF THE DRAWINGS

Other features, objects and advantages of the present disclosure will become more apparent by reading the detailed descriptions about the non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
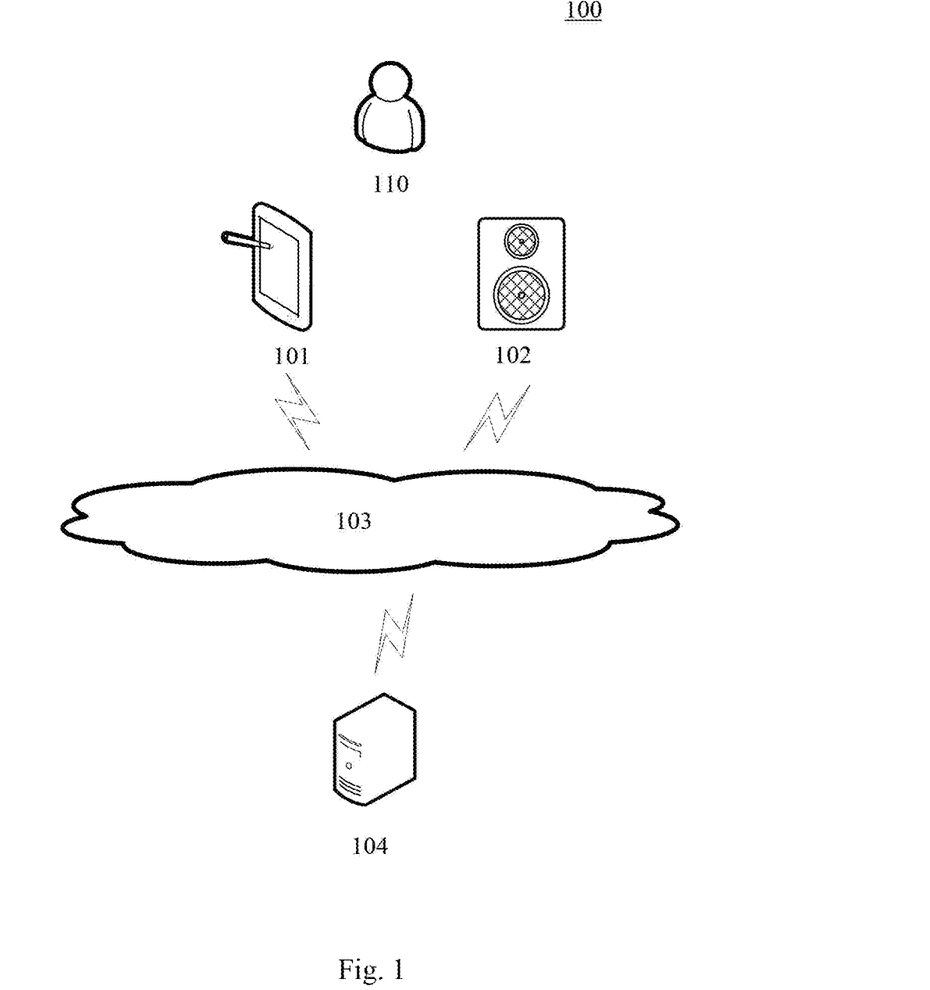
FIG. 1 is an exemplary system architecture to which the present disclosure may be applied.

FIG. 1 shows an exemplary architecture of a system 100 which may be used by a method or apparatus for recommendating news according to the embodiments of the present disclosure.

As shown in FIG. 1, the system architecture 100 may include terminal devices 101 and 102, a network 103 and a server 104. The network 103 serves as a medium providing a communication link between the terminal devices 101 and 102 and the server 104. The network 103 may include various types of connections, such as wired or wireless transmission links, or optical fibers.

A user 110 may interact with the server 104 over the network 103 using the terminal devices 101 and 102 to receive or send a message. The terminal devices 101 and 102 may be an electronic device having an audio input interface, an audio output interface and a display screen and supporting network communication, such as a smart speaker with a microphone and a display screen, a smart home appliance, a smartphone, a tablet, a notebook computer and a smart wearable device. An application that interacts with the server 104, such as a voice service client, may be installed in the terminal devices 101 and 102.

The server 104 may be a server that provides various services, for example, a voice server that controls a voice output operation as performed by the terminal device 101, 102. After the terminal devices 101 and 102 accesses a voice server (for obtaining an authorization, for example), the voice server may process a voice service request from the user 110 through the terminal devices 101 and 102 and send a processing result (for example, audio data and an audio output interface control instruction) to the terminal devices 101 and 102. The terminal devices 101 and 102 may receive audio data and a display control instruction from the server 104 through the network 103 and execute a corresponding audio output operation and a display operation so as to complete a voice service by using the terminal devices 101 and 102.

It should be noted that the method for recommending news as provided by the present embodiment of the present disclosure is generally performed by the server 104, and an apparatus for recommending news is generally provided in the server 104 correspondingly.

It should be understood that the numbers of the terminal devices, networks and servers in FIG. 1 are merely illustrative. There may be any number of terminal devices, networks and servers, depending on the implementation needs. For example, the server may be a clustered server comprising a plurality of servers provided with different processes.

Figure 2:
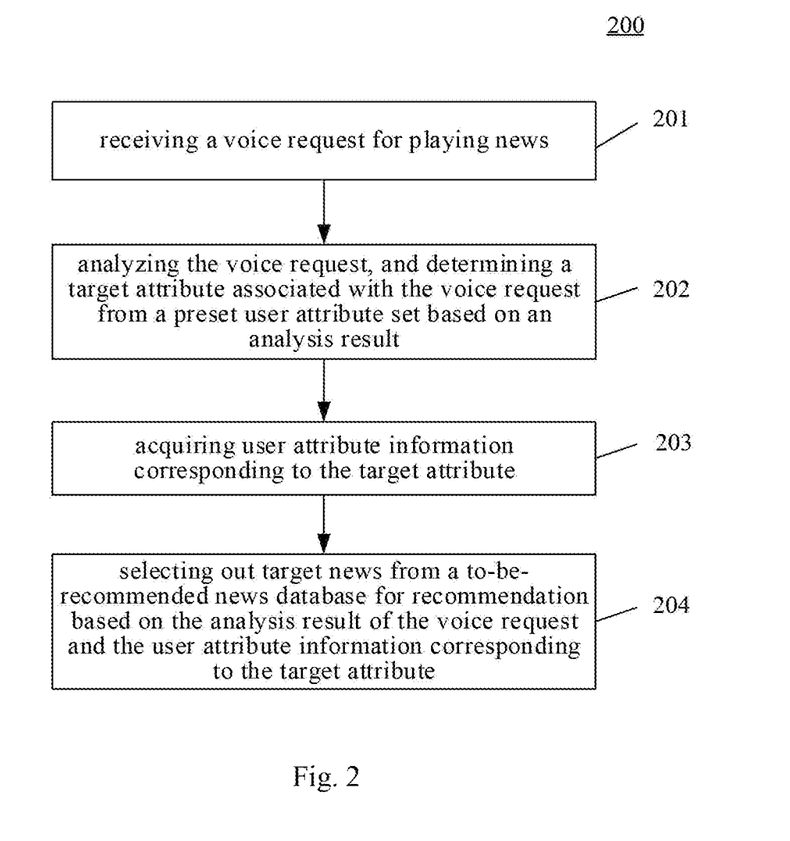
FIG. 2 is a flowchart of an embodiment of a method for recommending news according to the present disclosure.

Referring further to FIG. 2, there is shown a flow 200 of one embodiment of a method for recommending news according to the present disclosure. The method for recommending news comprises the following steps:

Step 201: receiving a voice request for playing news.

In the present embodiment, the electronic device (for example, the server shown in FIG. 1) to which the method for recommending news is applied may receive a request for playing news from a smart voice device. The request for playing news may be sent by a user who interacts with a smart voice device by voice, and the smart voice device may be a device that has accessed the voice service provided by the electronic device to which the method for recommending news is applied.

The electronic device may detect whether the smart voice device sends a voice request in real time and detect whether the voice request is a voice request for playing news. Specifically, the electronic device may detect whether the voice request comprises a keyword "news" or a keyword combination "listen"+"news", "play"+"news" or the like requesting to play news. Alternatively, the electronic device may wake up in response to a wake-up instruction issued by the user before receiving the request for playing news, and then detect the voice request in real time.

In an actual scenario, the user may send a voice request "play  news" to the smart voice device, and the smart voice device may transcode the voice request of the user, encapsulate and transmit the voice request to a voice server, and the voice server may receive the voice request "play  news" from the smart voice device.

Step 202: analyzing the voice request, and determining a target attribute associated with the voice request from a preset user attribute set based on an analysis result.

In the present embodiment, the received voice request information may be subject to data analysis first to extract a voice request content therefrom. Specifically, the voice request information may be converted into text information, and then the voice request content is semantically analyzed. During semantic analysis, a language model may be used for word segmentation, and a user characterized by the voice request content may then be identified on the basis of a semantic analysis method such as N-gram model (also referred to as "n-gram model").

Then, a target attribute associated with the voice request may be determined from the preset user attribute set based on an analysis result. The preset user attribute set may be a preset set of user attributes, comprising a plurality of user attributes. The user attribute may be an identifier of a characteristic attribute of certain category of a user, and may comprise, for example, the age range, preference and habit of the user.

Optionally, the preset user attribute set may comprise but not limited to the following user attributes: a geographical location, an occupation and a point of interest. The geographical location may comprise the city, home address and work address that are frequently used by the user; the occupation may comprise the field of practice, employer and position of the user; and the point of interest may comprise the interest and focus of the user.

In the present embodiment, an analysis may be performed on an association between the analysis result of the voice request information and the user attribute in the preset user attribute set. Specifically, a semantic similarity between the analysis result of the voice request information and the user attribute may be calculated. For example, the analysis result and the user attribute may be vectorized, and a similarity between the two vectors is calculated as a semantic similarity between the analysis result and the user attribute so as to determine an association according to the semantic similarity.

In some optional implementations, it may be determined whether the voice similarity is greater than a preset threshold. If yes, it may be determined that the voice request is associated with a corresponding user attribute, and it may further be determined that the user attribute is a target attribute. If not, it may be determined that the voice request is not associated with a corresponding user attribute. Therefore, a target attribute associated with the voice request may be determined from the preset user attribute set.

Optionally, when the association between the voice request information and a user attribute in the preset user attribute set is analyzed on the basis of the analysis result, a degree of association may further be determined based on a similarity between the analysis result and the user attribute so as to determine a weight of the user attribute according to the degree of association.

Step 203: acquiring user attribute information corresponding to the target attribute.

Then, user attribute information corresponding to the target attribute may be acquired through stored user data. The user attribute information may be a specific parameter of a characteristic attribute of the user and is corresponding to each user attribute. For example, the user attribute information corresponding to an age range attribute of the user may be the age range data or the age data of the user. For example, the age of the user is between 25 and 35 years old. The user attribute information corresponding to a geographical location attribute may comprise living area information and working area information of the user. For example, the living area of the user is a residential area in Haidian District, Beijing, and the working address is at a science park in Haidian District, Beijing. User attribute information corresponding to an occupation attribute may comprise information about the area of practice, employer and position of the user, for example technology industry—smart phone industry—** mobile phone company—sales executive. User attribute information corresponding to a point of interest attribute may comprise things and topics that the user is interested in or focuses on, for example a science and technology event that the user is interested in, variety show or investment and financial news that the user focuses on recently.

The user attribute information may be collected and stored by initiatively reporting by the user. For example, the user may provide some basic attribute information while registering. The user attribute information may also be obtained by analysis on the history of an interaction between the smart voice device and the user and stored in advance. For example, if the user frequently sends requests to obtain news information of a certain category, it may be determined that the user is interested in the topic or things of such category. In some optional implementations, the smart device may be connected with a different electronic device (such as a mobile phone, a personal computer) of the user. For example, the user attribute information may be acquired by an electronic device of the user. In some other optional implementations, the smart electronic device may acquire user attribute information over a network. For example, geographical location information may be acquired over a network.

Step 204: selecting out target news from a to-be-recommended news database for recommendation based on the analysis result of the voice request and the user attribute information corresponding to the target attribute.

The electronic device to which the method for recommending news is applied may select out from to-be-recommended news database to-be-recommended news that matches the analysis result of the voice request and/or the user attribute information corresponding to the target attribute as target news. That is, each to-be-recommended news in the to-be-recommended news database is matched with the analysis result and/or the user attribute information corresponding to the target attribute, and to-be-recommended news that is matched successfully is target news. A matching method based on semantic similarity may be used for the matching.

In some optional implementations of the present embodiment, an intent of a user may be analyzed on the basis of the analysis result of the voice request information and/or the user attribute information corresponding to the target attribute first to determine a news category that the user wishes to listen to, and then to-be-recommended news meeting the intent of the user is selected out from the to-be-recommended news database as target news to recommend. A plurality of means may be used for intent analysis. For example, a keyword used to characterize a news category may be extracted from the analysis result or the user attribute information corresponding to the target attribute; or a text content of the voice request may be used as a search condition to search in a network database. The search result usually may meet the needs of the user, information that characterizes the intent of the user may be extracted from the search result, or the intent of the user may also be identified by an intent recognition model trained with a method based on machine learning.

Optionally, since a weight of each target attribute may be determined according to a degree of association while an association between the voice request and the user attribute is analyzed in the step 202, target news may be selected by combining the weight of the target attribute. Specifically, a selecting process may be weighted according to the weight of the target attribute when each to-be-recommended news in the to-be-recommended news database is matched with the attribute information corresponding to each target attribute and target news is selected. For example, when a matching degree is ranked, a matching degree of each user attribute information is weighted, which may enhance the importance of user attribute information with strong association in selecting target news and select out news more in line with the needs of the user.

After target news is determined, the target news may be pushed to a smart voice device that sends a voice request, and the smart voice device may perform voice synthesis on the received target news and play an audio of the target news. Optionally, if the smart voice device comprises a display screen, a related news video may be played in the display screen.

The method for recommending news provided by embodiments of the present disclosure realizes news recommendation based on voice interaction by: receiving a voice request for playing news, analyzing the voice request and determining a target attribute associated with the voice request from a preset user attribute set based on an analysis result, acquiring user attribute information corresponding to the target attribute, and selecting out target news from to-be-recommended news database for recommendation based on the analysis result of the voice request and the user attribute information corresponding to the target attribute, and associates the analysis result of the voice request and the user attribute information associated with the voice request while recommendation, thereby improving the pertinence of news recommendation.

Figure 3:
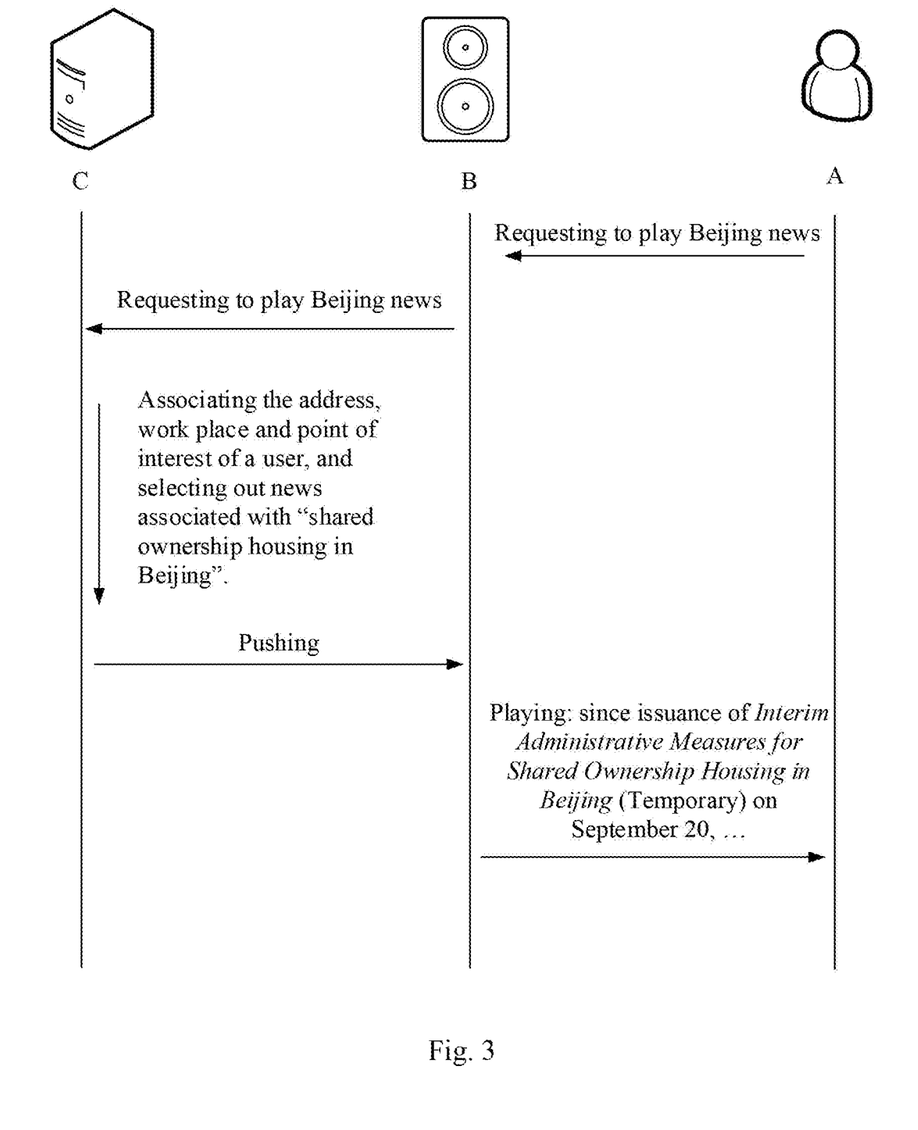
FIG. 3 is a schematic diagram of an application scenario of a method for recommending news according to the present disclosure.

Referring to FIG. 3, there is shown a schematic diagram of an application scenario of a method for recommending news according to an embodiment of the present disclosure. As shown in FIG. 3, a user A sends a request for "Playing Beijing news" to a smart voice device B, and the smart voice device B forwards the request to a voice server C. The voice server C may receive the request, and then analyze the request to obtain an association of "Beijing" with a location attribute and a point of interest attribute so as to acquire information about the address, work place and point of interest of the user. For example, if both the address and work place of the user are in Beijing and the topic that the user focuses on is shared ownership housing, news associated with the shared ownership housing in Beijing may be selected out and pushed to the smart voice device B, and the smart voice device B may play the news as pushed by the voice server C for the user.

In some optional implementations of the present embodiment, the step 202 of determining a target attribute associated with the voice request from a preset user attribute set based on an analysis result may comprise: determining a news category demand as indicated by the voice request based on the analysis result, and determining a target attribute associated with the news category demand as indicated by the voice request according to a preset associated relation table between news categories and user attributes.

In the present implementation, a news category as requested by a user to play may be determined by analysis on the voice request. Specifically, an identifier of a news category as contained in an analysis result of the voice request may be determined, and a news category demand as indicated by the voice request is determined as a news category characterized by the identifier comprised therein. Then, a preset associated relation table between the news categories and the user attributes may be look for, and a user attribute associated with the news category demand as indicated by the voice recognition request is looked up as a target attribute.

The associated relation table between the news categories and the user attributes may be preconfigured. Optionally, the news categories may comprise but not limited to a region category, a field category and a hot keyword category. Optionally, the news category may also comprise a generic demand category, that is, a category that does not indicate any characteristic of the news. A regional news may be news of a certain region, for example, a Beijing News; a field news may be news of an industry, for example, news of the car industry; and a hot keyword news may be news associated with a hot keyword, for example, news associated with "artificial intelligence". In this way, user attribute information that needs to be associated when target news is selected may be quickly determined according to the associated relation table, thereby improving the recommendation efficiency.

In an actual scenario, when a user sends a voice request, the user may designate a certain category of news he/she wants to play. For example, when a request for playing a local news is sent, it may be determined that a news category demand as indicated by the voice request is a regional category news. If the voice request sent by the user does not comprise a specific news category keyword such as "play news", it may be determined that a news category demand as indicated by the voice request is a generic demand category.

Optionally, it may be pre-configured in the associated relation table between the news categories and the user attributes. A user attribute associated with a regional category comprises the geographic location; a user attribute associated with a field category comprises the occupation and point of interest; a user attribute associated with a hot key word category comprises the occupation and point of interest; and a user attribute associated with a generic demand category comprises the geographical location, occupation and point of interest.

In other optional implementations of the present embodiment, the step 202 of determining a target attribute associated with the voice request from a preset user attribute set based on an analysis result comprises: judging whether the analysis result contains a keyword associated with an identifier of a user attribute in the preset user attribute set; and if yes, extracting the user attribute having the identifier matching the keyword in the analysis result as the target attribute.

Specifically, a word obtained after word segmentation on a voice request content is compared with an identifier of each user attribute in a preset user attribute set, and if the comparison result is consistent, a consistent user attribute is taken as the target attribute.

In an actual scenario, the identifier of the user attribute may be, for example, "work place", "address", "industry", "position" and "interest". If the voice request sent by the user is "play industry news" and the request comprises an identifier "industry" of the user attribute, it may be determined that a user attribute corresponding to "industry" is the target attribute. In the subsequent step 203, attribute information associated with the industry of the user may be acquired.

Figure 4:
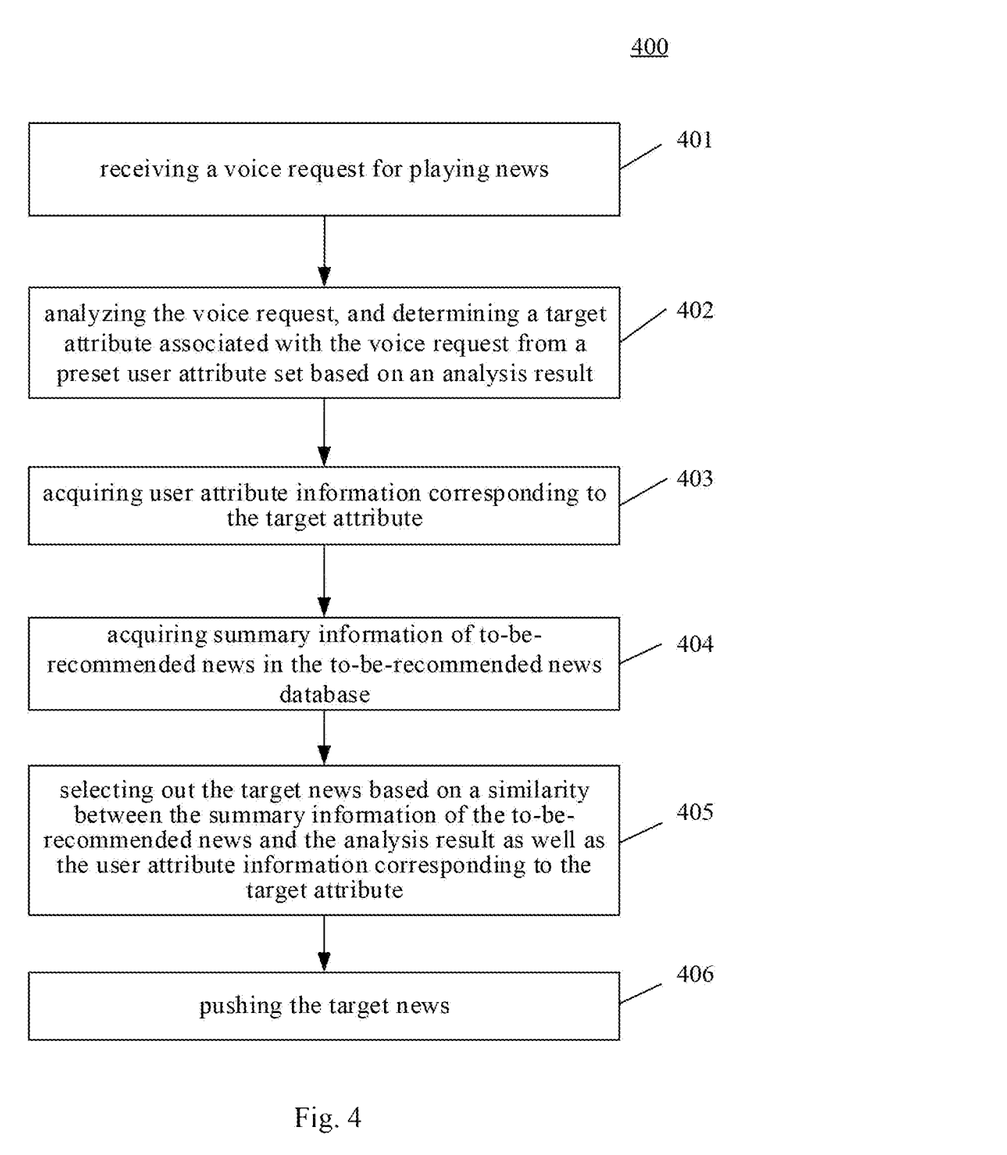
FIG. 4 is a flowchart of another embodiment of a method for recommending news according to the present disclosure.

Referring further to FIG. 4, there is shown a flow diagram of another embodiment of a method for recommending news according to the present disclosure. As shown in FIG. 4, the flow 400 of the method for recommending news in the present embodiment comprises the following steps:

Step 401: receiving a voice request for playing news.

In the present embodiment, the electronic device to which the method for recommending news is applied may receive a voice request sent by a user for playing news through a smart voice device.

Step 402: analyzing the voice request, and determining a target attribute associated with the voice request from a preset user attribute set based on an analysis result.

A semantic analysis method may be used to analyze a content of the voice request, or the voice request may be converted from voice into a text, and then the text is subject to work segmentation with a language model to obtain an analysis result. Afterwards, a target attribute associated with the voice request may be determined based on the analysis result of the association between the analysis result of the voice request information and the user attribute in the preset user attribute set.

Step 403: acquiring user attribute information corresponding to the target attribute.

In the present embodiment, the attribute information corresponding to the target attribute may be acquired from a pre-stored user attribute information set, and corresponding user attribute information may also be collected according to the target attribute by using associated data search in the network.

In the present embodiment, the steps 401, 402 and 403 are respectively consistent with the steps 201, 202 and 203 in the foregoing embodiment, and will thus not be described in detail herein again.

Step 404: acquiring summary information of to-be-recommended news in the to-be-recommended news database, the summary information comprising a title and a content summary.

In the present embodiment, summary information of each to-be-recommended news in to-be-recommended news database may be acquired first, and the summary information herein may be a summary expression of a news content and may comprise a title and a content summary. The summary information of each to-be-recommended news may be already configured or may be extracted by text summarization on the each to-be-recommended news.

Step 405, selecting out the target news based on a similarity between the summary information of the to-be-recommended news and the analysis result as well as the user attribute information corresponding to the target attribute.

The summary information of news has a small number of bytes, but comprises a lot of information, and the summary information of news usually comprises key information of the news. In the present embodiment, a similarity between the summary information and the analysis result as well as the attribute information corresponding to the target attribute may be calculated, and to-be-recommended news with a high similarity may be selected as the target news. Specifically, the analysis result may be combined with the attribute information corresponding to the target attribute to calculate a similarity between the summary information and a combination result.

In some optional implementations of the present embodiment, the step of selecting out a target news on the basis of a similarity between the summary information of each to-be-recommended news and the analysis result as well as the attribute information corresponding to the target attribute may comprise (that is, the target news is selected out in the following means): determining a recommendation index of the to-be-recommended news based on a similarity between the summary information of the to-be-recommended news and the analysis result, and a similarity between the summary information of the to-be-recommended news and the user attribute information corresponding to the target attribute; and selecting out a target news based on the recommendation index.

Specifically, a first similarity between the summary information of to-be-recommended news and the analysis result of the voice request information may be calculated, and then a second similarity between the summary information of the to-be-recommended news and the user attribute information corresponding to the target attribute may be calculated. When the first similarity and the second similarity are calculated, text words may be vectorized, a similarity between vectors is calculated, and then the first similarity and the second similarity are subject to weighted summation to obtain a recommendation index of each to-be-recommended news. Optionally, the recommendation index may also be adjusted correspondingly with the popularity data of the to-be-recommended news, so that the recommendation index of to-be-recommended news with a relatively high popularity is relatively high. Then news with the top M (M is a preset positive integer) recommended indexes may be selected as the target news. In this way, news with a high degree of information concentration and meeting user demands may be selected out more effectively.

In some other optional implementations of the present embodiment, the step of selecting out the target news based on a similarity between the summary information of each to-be-recommended news and the analysis result as well as the user attribute information corresponding to the target attribute may comprise (that is, the target news may also be selected out in the following means): selecting out a first candidate news associated with the analysis result based on a similarity between the summary information of each to-be-recommended news and the analysis result; selecting out a second candidate news associated with the user attribute information corresponding to the target attribute based on a similarity between the summary information of the each to-be-recommended news and the user attribute information corresponding to the target attribute; and using the first candidate news and the second candidate news as the target news. In other words, a first candidate news with a high similarity between summary information thereof and the analysis result and a second candidate news with a high similarity between summary information thereof and the user attribute corresponding to the target attribute may be selected out from the to-be-recommended news database, and the first candidate news and the second candidate news are added to target news set for recommendation, thereby enhancing the diversity of recommended types of target news.

Step 406: pushing the target news.

After the target news is determined, the target news may be sent to a smart voice device for the smart voice device to play the target news. The selected target news may comprise a plurality of news, and the plurality of news may be packaged and pushed to the smart voice device.

In some optional implementations of the present embodiment, the step 406 of pushing the target news may comprise: pushing the summary information of the target news; and pushing a full text of the target news in response to receiving a voice request for playing a full text of the target news. In these implementations, the summary information of the target news may be pushed first, so that the user may quickly acquire a plurality of news information. In addition, when a request for playing a detailed content of news from the user is received, a corresponding full text of the news may be sent to the smart voice device to play, which may save network resources and enhance the pushing efficiency.

In some optional implementations of the present embodiment, the step of selecting out target news from to-be-recommended news database for recommendation based on the analysis result of the voice request and the user attribute information corresponding to the target attribute may further comprise: determining recommendation order information of the target news based on a similarity between the summary information of the to-be-recommended news and the analysis result as well as the user attribute information corresponding to the target attribute. At this time, the step 406 may be implemented in the following means: pushing the target news and corresponding recommendation order information to a smart voice device to allow the smart voice device to play a target news corresponding to a preset recommendation order as indicated by the user when a request for playing the target news corresponding to the preset recommendation order is received from the user.

Specifically, the recommendation order of the target news may be determined by ranking the similarity between the summary information of each selected target news and the analysis result as well as the user attribute information corresponding to the target attribute, and news with a large similarity is in the top. When the target news is pushed, the order of the target news may be pushed. Therefore, when the smart voice device plays the news, the smart voice device may respond to the request for playing the target news corresponding to the preset recommendation order from the user, for example, "Next" or "Previous", and the response is to play the target news in the order specified by the user.

It may be seen from FIG. 4 that the flow 400 of the method for recommending news as provided in the present embodiment of the present disclosure, compared with the embodiment as shown in FIG. 2, refines the step of selecting out the target news for recommendation. Therefore, the method in the present embodiment may realize more comprehensive and more accurate news recommendation.

Figure 5:
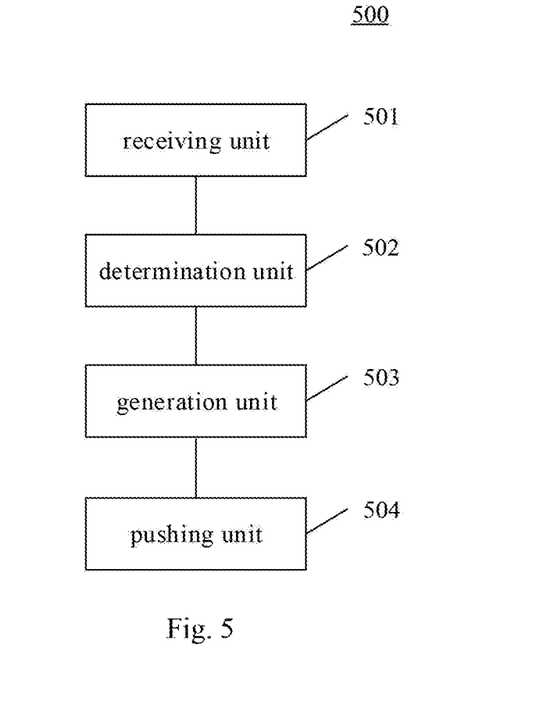
FIG. 5 is a structural diagram of an apparatus for recommending news according to the present disclosure.

With further reference to FIG. 5, as an implementation of the method as shown in each figure, the present disclosure provides an embodiment of an apparatus for recommending news, and the apparatus embodiment corresponds to the method embodiments shown in FIG. 2 and FIG. 4, and the apparatus may specifically be applied in a variety of electronic devices.

As shown in FIG. 5, an apparatus for recommending news 500 according to the present embodiment comprises a receiving unit 501, a determination unit 502, a generation unit 503 and a pushing unit 504. The receiving unit 501 is configured for receiving a voice request for playing news; the determination unit 502 is configured for analyzing the voice request, and determining a target attribute associated with the voice request from a preset user attribute set based on an analysis result; the acquisition unit 503 is configured for acquiring user attribute information corresponding to the target attribute; and the selecting unit 504 is configured for selecting out target news from to-be-recommended news database for recommendation based on the analysis result of the voice request and the user attribute information corresponding to the target attribute.

In the present embodiment, the receiving unit 501 may receive a voice request for playing news sent by the user to a smart voice device and transmitted by the smart voice device. The voice request for playing news herein may be a request including a keyword for playing news, and the keyword for playing news may be, for example, a keyword combination of "listen"+"news" or "play"+"news". Whether the voice request is a voice request for playing news may be determined by detecting the keyword of the played news.

The determining unit 502 may perform semantic analysis on the voice request received by the receiving unit 501, and specifically may analyze with a language model. Then, the association between the analysis result and the user attribute in the preset user attribute set may be analyzed. Specifically, a similarity between the two may be calculated to determine the association. For example, if the similarity is greater than a threshold, the two are associated; and if the similarity is not greater than the threshold, the two are not associated. Finally, an associated user attribute is determined on the basis of the association analysis result.

The acquisition unit 503 may acquire user attribute information corresponding to the target attribute from stored user attribute information. The user attribute information may be acquired through an associated account (for example, data generated by an associated account being operated in a different device), feedback information about a voice service from the user, a geographical location of a smart voice device, a usage scenario and the like.

The selecting unit 504 may match each to-be-recommended news in to-be-recommended news database with the analysis result and/or the user attribute information corresponding to the target attribute, and the to-be-recommended news that is matched successfully is the target news. A matching method based on semantic similarity may be used for the matching. Then the selected target news may be recommended.

In some embodiments, the determination unit 502 be further configured for determining a target attribute associated with the voice request from a preset user attribute in the following means: determining a news category demand as indicated by the voice request based on the analysis result; and determining a target attribute associated with the news category demand as indicated by the voice request according to a preset associated relation table between news categories and user attributes.

In some embodiments, the news categories comprise a region category, a field category and a hot keyword category.

In some embodiments, the determination unit 502 may be further configured for determining a target attribute associated with the voice request from a preset user attribute in the following means: judging whether the analysis result contains a keyword associated with an identifier of a user attribute in the preset user attribute set; and if yes, extracting the user attribute having the identifier matching the keyword in the analysis result as the target attribute.

In some embodiments, the selecting unit 504 may be further configured for selecting out target news from a to-be-recommended news database for recommendation in the following means: acquiring summary information of to-be-recommended news in the to-be-recommended news database, the summary information comprising a title and a content summary; selecting out the target news based on a similarity between the summary information of the to-be-recommended news and the analysis result as well as the user attribute information corresponding to the target attribute; and pushing the target news.

In some embodiments, the selecting unit 504 may be is further configured for selecting out the target news based on a similarity between the summary information of the to-be-recommended news and the analysis result as well as the user attribute information corresponding to the target attribute by: determining a recommendation index of the to-be-recommended news based on a similarity between the summary information of the to-be-recommended news and the analysis result, and a similarity between the summary information of the to-be-recommended news and the user attribute information corresponding to the target attribute; and selecting out a target news based on the recommendation index.

In some embodiments, the selecting unit 504 may be further configured for selecting out the target news based on a similarity between the summary information of the to-be-recommended news and the analysis result as well as the user attribute information corresponding to the target attribute in the following means: selecting out a first candidate news associated with the analysis result based on a similarity between the summary information of the to-be-recommended news and the analysis result; selecting out a second candidate news associated with the user attribute information corresponding to the target attribute based on a similarity between the summary information of the to-be-recommended news and the user attribute information corresponding to the target attribute; and using the first candidate news and the second candidate news as the target news.

In some embodiments, the selecting unit 504 may further push the target news in the following means: pushing summary information of the target news; and pushing a full text of the target news in response to receiving a voice request for playing a full text of the target news.

In some embodiments, the selecting unit is further configured for: determining recommendation order information of the target news based on a similarity between the summary information of the to-be-recommended news and the analysis result as well as the user attribute information corresponding to the target attribute. At that time, the selecting unit 504 may be further configured for pushing the target news in the following means: pushing the target news and corresponding recommendation order information to a smart voice device to allow the smart voice device to play a target news corresponding to a preset recommendation order as indicated by the user when a request for playing the target news corresponding to the preset recommendation order is received from the user.

In some embodiments, the user attribute set comprises the following user attribute: a geographic position, an occupation or a point of interest.

It should be understood that the units as recorded in the apparatus 500 correspond to the steps in the method as described in FIG. 2 and FIG. 4. Therefore, the operation and feature described for the method above apply to the apparatus 500 and units contained therein, and thus will not be described herein again.

The apparatus 500 for recommending news provided by the embodiments of the present disclosure realizes news recommendation based on voice interaction by: receiving, by a receiving unit, a voice request for playing news; analyzing, by a generation unit, the voice request, and determining a target attribute associated with the voice request from a preset user attribute set based on an analysis result; acquiring, by an acquisition unit, user attribute information corresponding to the target attribute; and selecting out, by a selecting unit, target news from to-be-recommended news database for recommendation based on the analysis result of the voice request and the user attribute information corresponding to the target attribute. In addition, the apparatus improves the pertinence of news recommendation by determining associated user attribute information based on the analysis result of the voice request while in recommendation.

Figure 6:
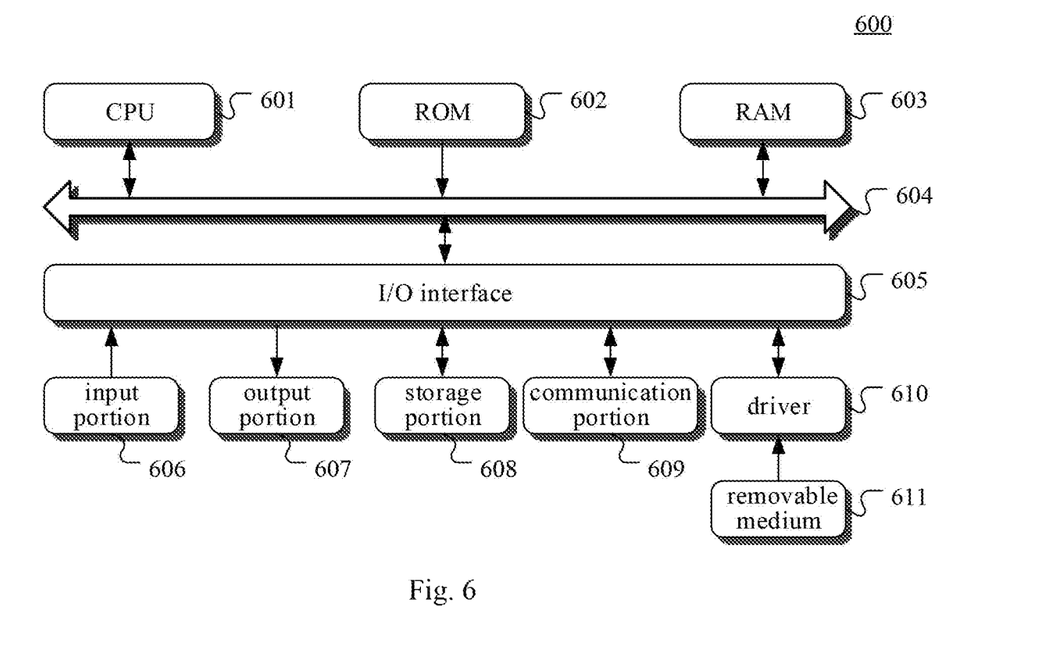
FIG. 6 is structural diagram of a computer system for realizing a server according to an embodiment of the present disclosure.

Referring to FIG. 6, a schematic structural diagram of a computer system 600 adapted to implement a server of the embodiments of the present disclosure is shown. The server shown in FIG. 6 is merely an example, which is not a limitation to the function and scope for using of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a receiving unit, a determination unit, an acquisition unit and a selecting unit, where the names of these units or modules do not in some cases constitute a limitation to such units or modules themselves. For example, the receiving unit may also be described as "a unit for receiving a voice request for playing news."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: receive a voice request for playing news; analyze the voice request, and determining a target attribute associated with the voice request from a preset user attribute set based on an analysis result; acquire user attribute information corresponding to the target attribute; and select out target news from to-be-recommended news database for recommendation based on the analysis result of the voice request and the user attribute information corresponding to the target attribute.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recommending news, comprising:
receiving a voice request for playing news;
analyzing the voice request, and determining a target attribute associated with the voice request from a preset user attribute set based on an analysis result;
acquiring user attribute information corresponding to the target attribute; and
selecting out target news from a to-be-recommended news database for recommendation based on the analysis result of the voice request and the user attribute information corresponding to the target attribute,
wherein the selecting out target news from a to-be-recommended news database for recommendation based on the analysis result of the voice request and the user attribute information corresponding to the target attribute comprises:
acquiring summary information of to-be-recommended news in the to-be-recommended news database, the summary information comprising a title and a content summary;
calculating a first similarity between the summary information of the to-be-recommended news and the analysis result;
calculating a second similarity between the summary information of the to-be-recommended news and the user attribute information corresponding to the target attribute;
obtaining a weighted summation of the first similarity and the second similarity;
selecting out the target news based on the weighted summation of the first similarity and the second similarity; and
pushing the target news.

2. The method according to claim 1, the determining the target attribute associated with the voice request from the preset user attribute set based on the analysis result comprises:
determining a news category demand as indicated by the voice request based on the analysis result; and
determining the target attribute associated with the news category demand as indicated by the voice request according to a preset associated relation table between news categories and user attributes.

3. The method according to claim 2, wherein the news categories comprise a region category, a field category and a hot keyword category.

4. The method according to claim 1, wherein the determining the target attribute associated with the voice request from the preset user attribute set based on the analysis result comprises:
judging whether the analysis result contains a keyword associated with an identifier of a user attribute in the preset user attribute set; and
it yes, extracting the user attribute having the identifier matching the keyword in the analysis result as the target attribute.

5. The method according to claim 1, wherein the selecting out the target news based on a similarity between the summary information of the to-be-recommended news and the analysis result as well as the user attribute information corresponding to the target attribute comprises:
determining a recommendation index of the to-be-recommended news based on the first similarity and the second similarity; and
selecting out the target news based on the recommendation index.

6. The method according to claim 1, wherein the selecting out the target news based on a similarity between the summary information of the to-be-recommended news and the analysis result as well as the user attribute information corresponding to the target attribute comprises:
selecting out a first candidate news associated with the analysis result based on the first similarity;
selecting out a second candidate news associated with the user attribute information corresponding to the target attribute based on the second similarity; and
using the first candidate news and the second candidate news as the target news.

7. The method according to claim 1, wherein the pushing the target news comprises:
- pushing summary information of the target news; and
- pushing a full text of the target news in response to receiving the voice request for playing a full text of the target news.

8. The method according to claim 1, wherein the selecting out target news from the to-be-recommended news database for recommendation based on the analysis result of the voice request and the user attribute information corresponding to the target attribute further comprises:
- determining recommendation order information of the target news based on the first similarity and the second similarity; and wherein the pushing the target news comprises:
- pushing the target news and corresponding recommendation order information to a smart voice device to allow the smart voice device to play the target news corresponding to a preset recommendation order as indicated by the user when a request for playing the target news corresponding to the preset recommendation order is received from the user.

9. The method according to claim 1, wherein the user attribute set comprises the following user attribute: a geographic position, an occupation or a point of interest.

10. An apparatus for recommending news, comprising:
- at least one processor; and
- a memory storing instructions, which when executed by the at least one processor, cause the at least one processor to perform operations, the operations comprising:
  - receiving a voice request for playing news;
  - analyzing the voice request, and determining a target attribute associated with the voice request from a preset user attribute set based on an analysis result;
  - acquiring user attribute information corresponding to the target attribute; and
  - selecting out target news from to-be-recommended news database for recommendation based on the analysis result of the voice request and the user attribute information corresponding to the target attribute, wherein the selecting out target news from a to-be-recommended news database for recommendation based on the analysis result of the voice request and the user attribute information corresponding to the target attribute comprises:
    - acquiring summary information of to-be-recommended news in the to-be-recommended news database, the summary information comprising a title and a content summary;
    - calculating a first similarity between the summary information of the to-be-recommended news and the analysis result calculating a second similarity between the summary information of the to-be-recommended news and the user attribute information corresponding to the target attribute;
    - obtaining a weighted summation of the first similarity and the second similarity;
    - selecting out the target news based on the weighted summation of the first similarity and the second similarity; and
    - pushing the target news.

11. The apparatus according to claim 10, wherein the determining the target attribute associated with the voice request from the preset user attribute set based on the analysis result comprises:
- determining the news category demand as indicated by the voice request based on the analysis result; and
- determining the target attribute associated with the news category demand as indicated by the voice request according to a preset associated relation table between news categories and user attributes.

12. The apparatus according to claim 11, wherein the news categories comprise a region category, a field category and a hot keyword category.

13. The apparatus according to claim 10, wherein the determining the target attribute associated with the voice request from the preset user attribute set based on the analysis result comprises: judging whether the analysis result contains a keyword associated with an identifier of a user attribute in the preset user attribute set; and
- if yes, extracting the user attribute having the identifier matching the keyword in the analysis result as the target attribute.

14. The apparatus according to claim 10, wherein the selecting out the target news based on a similarity between the summary information of the to-be-recommended news and the analysis result as well as the user attribute information corresponding to the target attribute comprises:
- determining a recommendation index of the to-be-recommended news based on the first similarity and the second similarity; and
- selecting out the target news based on the recommendation index.

15. The apparatus according to claim 10, wherein the selecting out the target news based on a similarity between the summary information of the to-be-recommended news and the analysis result as well as the user attribute information corresponding to the target attribute comprises:
- selecting out a first candidate news associated with the analysis result based on the first similarity;
- selecting out a second candidate news associated with the user attribute information corresponding to the target attribute based on the second similarity a similarity; and
- using the first candidate news and the second candidate news as the target news.

16. The apparatus according to claim 10, wherein the pushing the target news comprises:
- pushing summary information of the target news; and
- pushing a full text of the target news in response to receiving the voice request for playing a full text of the target news.

17. The apparatus according to claim 10, wherein the selecting out target news from the to-be-recommended news database for recommendation based on the analysis result of the voice request and the user attribute information corresponding to the target attribute further comprises:
- determining recommendation order information of the target news based on the first similarity and the second similarity; and
- the pushing the target news comprises:
- pushing the target news and corresponding recommendation order information to a smart voice device to avow the smart voice device to play the target news corresponding to a preset recommendation order as indicated by the user when a request for playing the target news corresponding to the preset recommendation order is received from the user.

18. The apparatus according to claim 10, wherein the user attribute set comprises the following user attribute: a geographic position, an occupation or a point of interest.

19. A non-transitory computer readable storage medium storing a computer program, wherein the computer program, when executed by a processor, causes the processor to perform operations, the operations comprising:
receiving a voice request for playing news;
analyzing the voice request, and determining a target attribute associated with the voice request from a preset user attribute set based on an analysis result;
acquiring user attribute information corresponding to the target attribute; and
selecting out target news from a to-be-recommended news database for recommendation based on the analysis result of the voice request and the user attribute information corresponding to the target attribute, wherein the selecting out target news from a to-be-recommended news database for recommendation based on the analysis result of the voice request and the user attribute information corresponding to the target attribute comprises:
acquiring summary information of to-be-recommended news in the to-be-recommended news database, the summary information comprising a title and a content summary;
calculating a first similarity between the summary information of the to-be-recommended news and the analysis result;
calculating a second similarity between the summary information of the to-be-recommended news and the user attribute information corresponding to the target attribute;
obtaining a weighted summation of the first similarity and the second similarity;
selecting out the target news based on the weighted summation of the first similarity and the second similarity; and
pushing the target news.

\* \* \* \* \*

UNITED STATES PATENT AND TRADEMARK OFFICE
CERTIFICATE OF CORRECTION

PATENT NO. : 10,922,355 B2
APPLICATION NO. : 15/856284
DATED : February 16, 2021
INVENTOR(S) : Xiaoli Tian et al.

Page 1 of 1

It is certified that error appears in the above-identified patent and that said Letters Patent is hereby corrected as shown below:

In the Claims

At Column 18, Line 43 (Claim 4, Line 8), please delete "it yes," and insert --if yes,-- therefor.

At Column 20, Line 39 (Claim 15, Line 10), please delete "on the second similarity a similarity;" and insert --on the second similarity;-- therefor.

At Column 20, Line 59 (Claim 17, Line 11), please delete "avow" and insert --allow-- therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*